Nov. 19, 1963 — L. EWING ETAL — 3,111,452
METHOD AND APPARATUS FOR MAKING FIBER CONDUIT
Filed Feb. 9, 1961 — 4 Sheets-Sheet 1
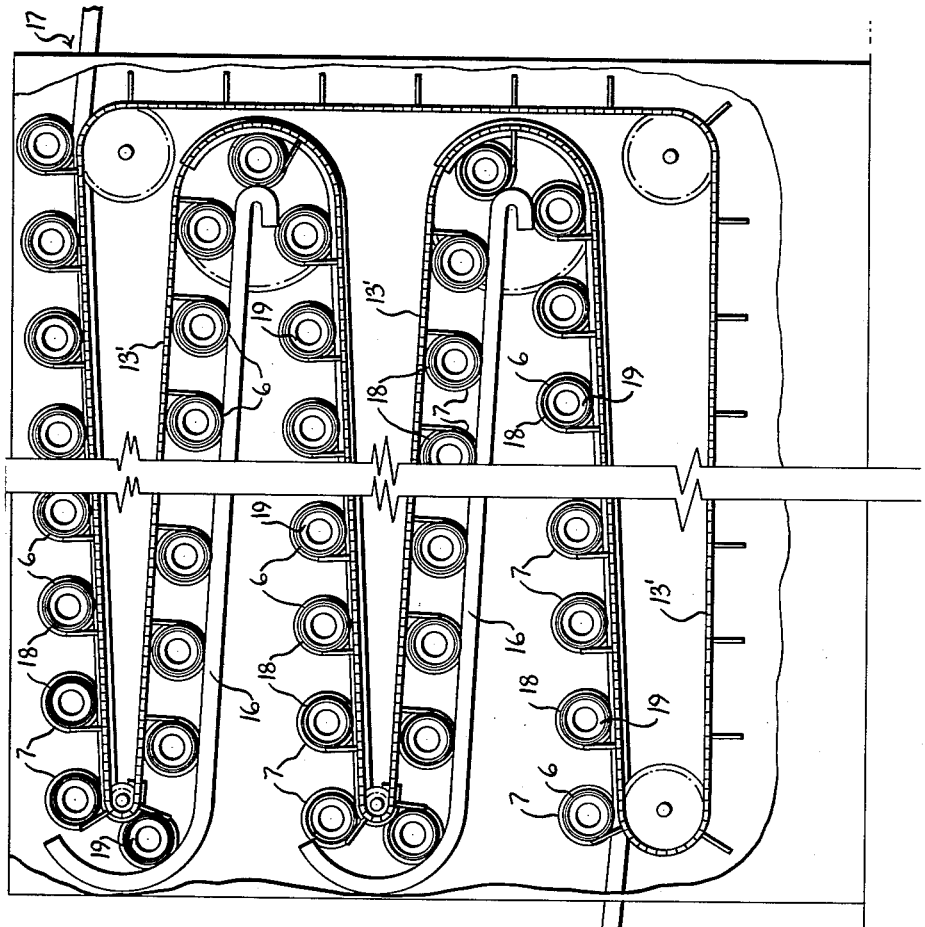
Fig. 1.
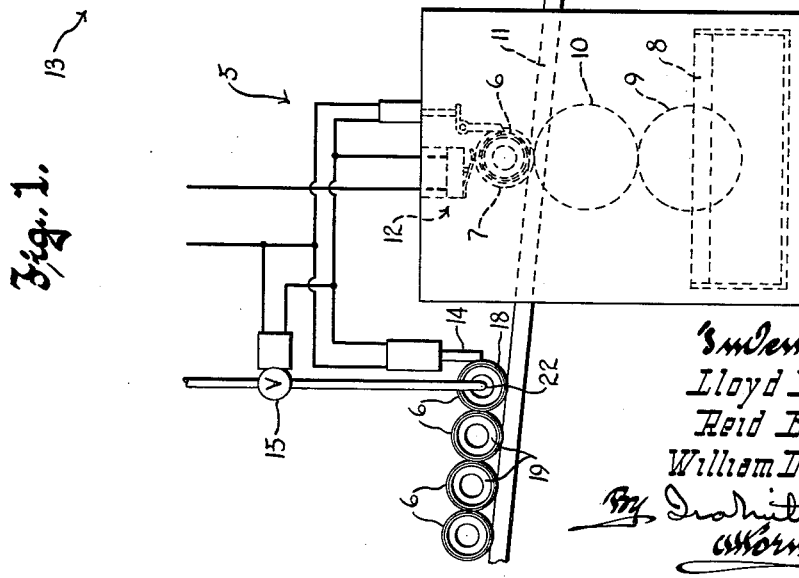
Inventors
Lloyd Ewing
Reid Ewing
William D. Kyle Jr.

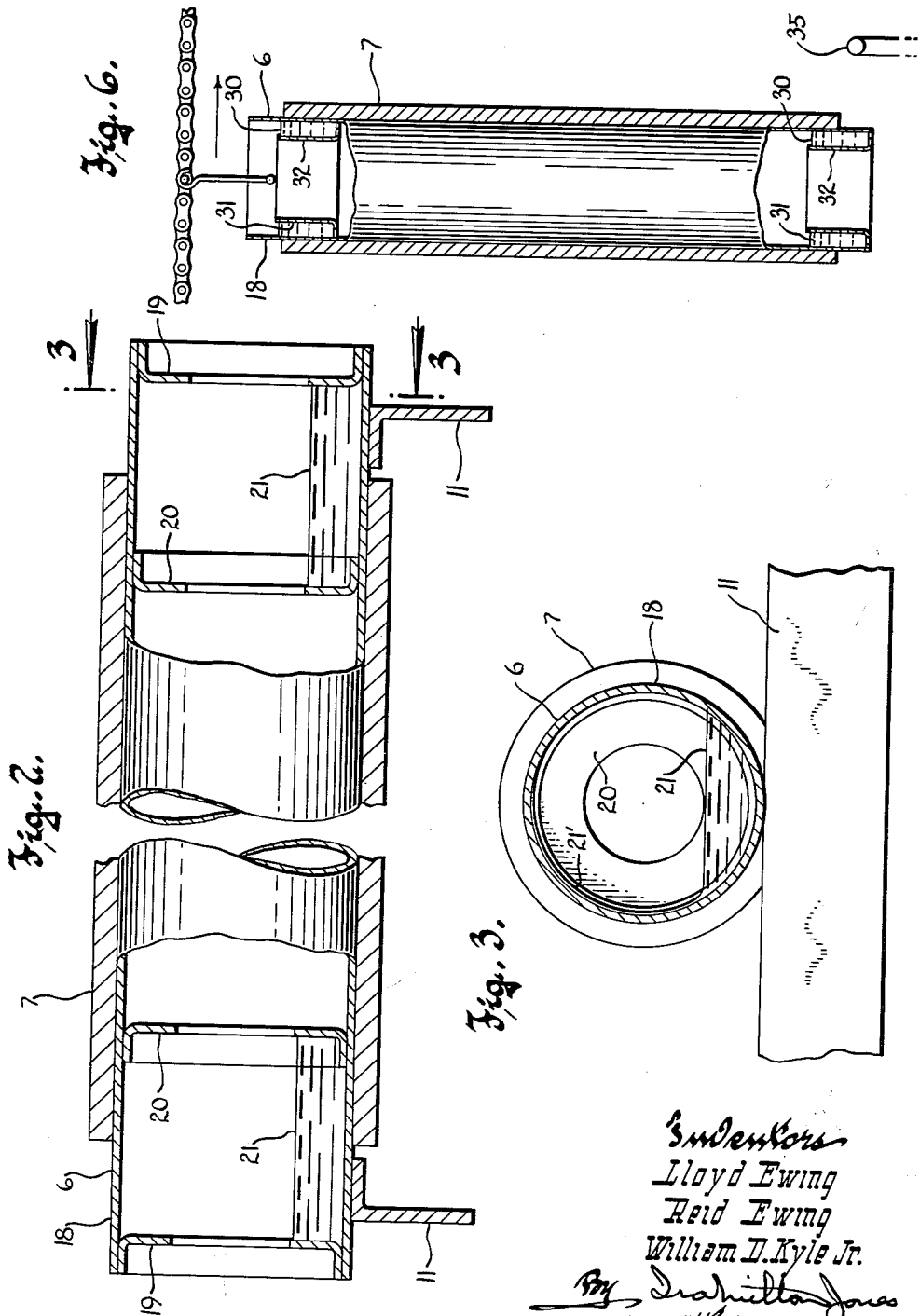

Nov. 19, 1963  L. EWING ETAL  3,111,452
METHOD AND APPARATUS FOR MAKING FIBER CONDUIT
Filed Feb. 9, 1961  4 Sheets-Sheet 3

Inventors
Lloyd Ewing
Reid Ewing
William D. Kyle Jr.
By
Attorney

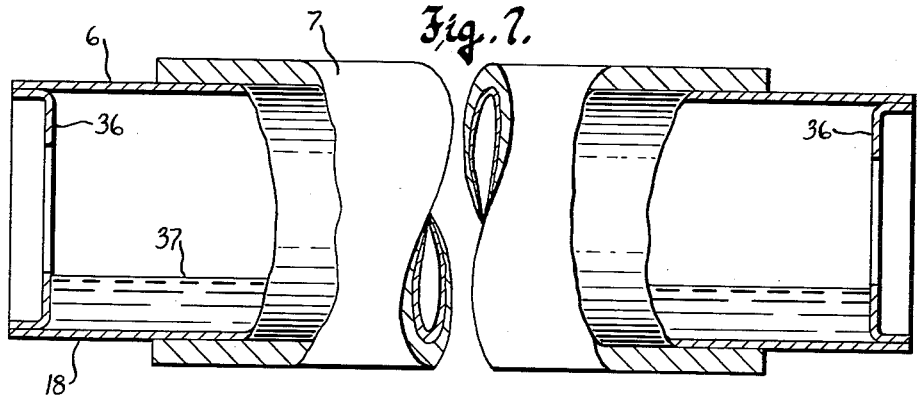
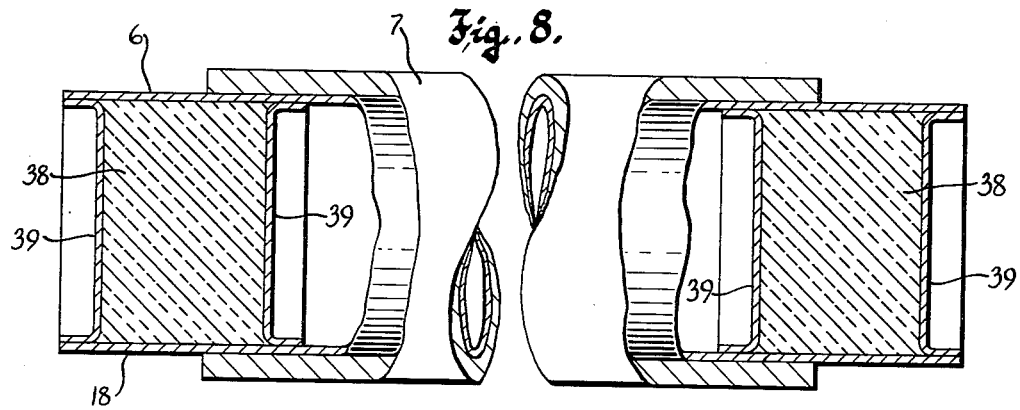
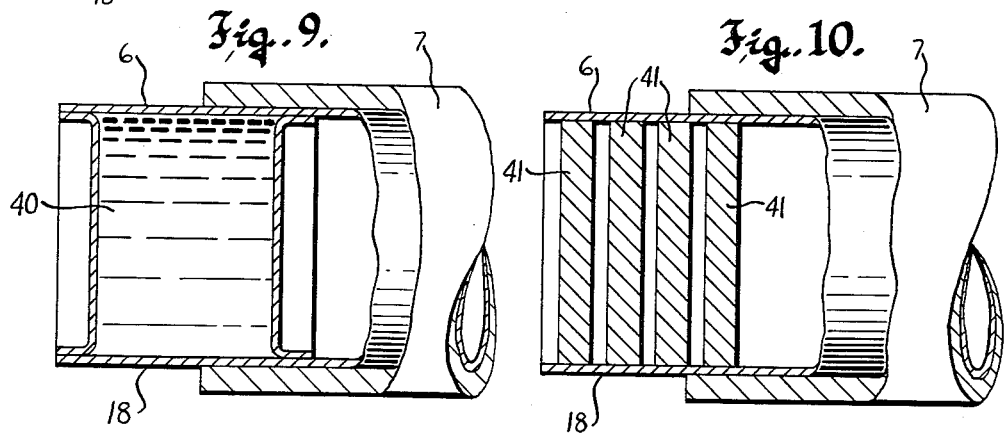

United States Patent Office

3,111,452
Patented Nov. 19, 1963

3,111,452
METHOD AND APPARATUS FOR MAKING
FIBER CONDUIT
Lloyd Ewing, Milwaukee, Wis., Reid Ewing, Huntington, W. Va., and William D. Kyle, Jr., Milwaukee, Wis., assignors to Kyova Fiber Pipe Company, Ironton, Ohio, a corporation of Delaware
Filed Feb. 9, 1961, Ser. No. 88,099
5 Claims. (Cl. 162—121)

This invention relates to the art of making fiber pipe of the type now widely used for drainage purposes, both underground and otherwise, and as condut for underground electric cables. Such pipe consists of a tube formed of fibrous material, generally paper pulp, impregnated with pitch or the like. The tube is made by winding or otherwise applying successive layers of wet pulp onto a hollow cylindrical metal mandrel, drying the same, and then removing it from the mandrel. As the product comes off the mandrel, it is known in the trade as a "white" tube, to distinguish it from the finished pipe or conduit which is ordinarily black, due to its being impregnated with pitch, or the like.

As brought out in the Ewing et al. Patent No. 2,724,189, and, before it, in the Hensler Patent No. 2,532,494, the drying of the wet or moist fibrous tube has always posed difficulties. Unless the tube is dried progressively from the outside in, delamination and voids within the wall of the tube may result. These objections may be avoided by drying the tube very slowly, but the time required for such slow drying makes this way of avoiding the problem uneconomical.

To a large degree, the drying method disclosed in the Ewing et al. patent has succeeded in overcoming the delamination problem and has eliminated voids in the tube wall, but in each of the several embodiments of the method disclosed in that patent, there are inherent objections. In most of the different schemes, plugs of insulating material must be assembled with the tubular metal mandrels just prior to the drying operation and removed therefrom immediately after the drying. This not only entails manual handling, but since the plugs must be of insulating material, and since plastic is generally used for this purpose, the material of which the plugs are made is degraded by the drying temperatures ordinarily employed. Accordingly, there is not only the expense of initially providing the plugs and the labor involved in attaching and removing them, but also that of maintaining them and replacing them when worn out.

Another disadvantage of the need for such plugs lies in the fact that they inevitably become worn and soon do not properly fit the tubular mandrel.

Still another objection to many of the schemes disclosed in the Ewing et al. patent resides in the fact that the plugs on the ends of the mandrels require extra oven space.

With a view toward overcoming the above and other objections to the drying methods heretofore used in this art, it is the purpose of this invention to provide an improved method of drying the moist fibrous tubes which completely eliminates the need for separate plugs in or on the ends of the tubular mandrels and, instead, achieves the objective of controlling the drying in a way which enables all the necessary appurtenances to be permanently mounted in the end portions of the tubular mandrels themselves.

More particularly, it is an object of this invention to provide an improved method of drying moist fibrous tubes while on tubular mandrels, wherein the desired control of the drying is effected by the maintenance in each mandrel of a heat absorbing media to abstract heat from the exposed end portions of the mandrel and thereby minimize the amount of heat that can be conducted to the tube by the mandrel.

The heat absorbing media may take various forms. It may be a solid material possessing the quality of accepting and holding a large quantity of heat; it may be a material which changes phase in the presence of heat, i.e., goes from a solid state to a liquid state at the temperatures involved; or it may be a liquid either in a hermetically sealed chamber or exposed to the atmosphere so as to evaporate as it absorbs heat, in which event the latent heat of evaporation would prove advantageous.

In any case, it is the purpose of this invention to control the drying of the tubes by absorbing heat from the mandrels by some means or media which is carried by the mandrels, as distinguished from preventing the flow of hot air through the mandrels and attempting to shield portions of the tubes from the heated air.

With the above and other objects in view which will appear as the description proceeds, this invention resides in the novel method and apparatus by which it is practiced, substantially as hereinafter described and more particularly defined by the appended claims, it being understood that such changes in the precise embodiment of the hereindisclosed invention may be made as come within the scope of the claims.

The accompanying drawings illustrate several complete examples of the apparatus employed in the practice of the invention, constructed according to the best modes so far devised for the practical application of the principles of the invention, and in which:

FIGURE 1 is a diagrammatic side view of an apparatus for making the so-called "white" tubes from paper pulp, which are subsequently impregnated with pitch or the like to form the finished product;

FIGURE 2 is a view in side elevation with parts broken away and in section, illustrating one of the mandrels used in the production of the "white" tubes, and wherein the heat absorbing media is an exposed pool of water in each end portion of the mandrel;

FIGURE 3 is a cross sectional view through FIGURE 2 on the plane of the line 3—3;

FIGURE 6 is a side view of a modified form of mandrel, which might be used in the practice of the invention, with the heat absorbing media in the form of pools of water in the opposite end portions of the mandrel, said view showing a tube on the mandrel and having parts broken away and in section;

FIGURE 7 is a view partly in side elevation and partly in longitudinal section, showing another form of mandrel using water or other suitable liquid as the heat absorbing media;

FIGURE 8 is a view also similar to FIGURE 7, showing the use of a heat absorbing media which changes phase, that is, goes from the solid to the liquid state, at the drying temperatures employed;

FIGURE 9 is a view of an end portion of the mandrel, to illustrate the use of a "locked in" body of liquid as the heat absorbing media; and FIGURE 10 is a view similar to FIGURE 9, illustrating one way of using a solid heat absorbing media which does not change phase upon heating.

Figure 4:
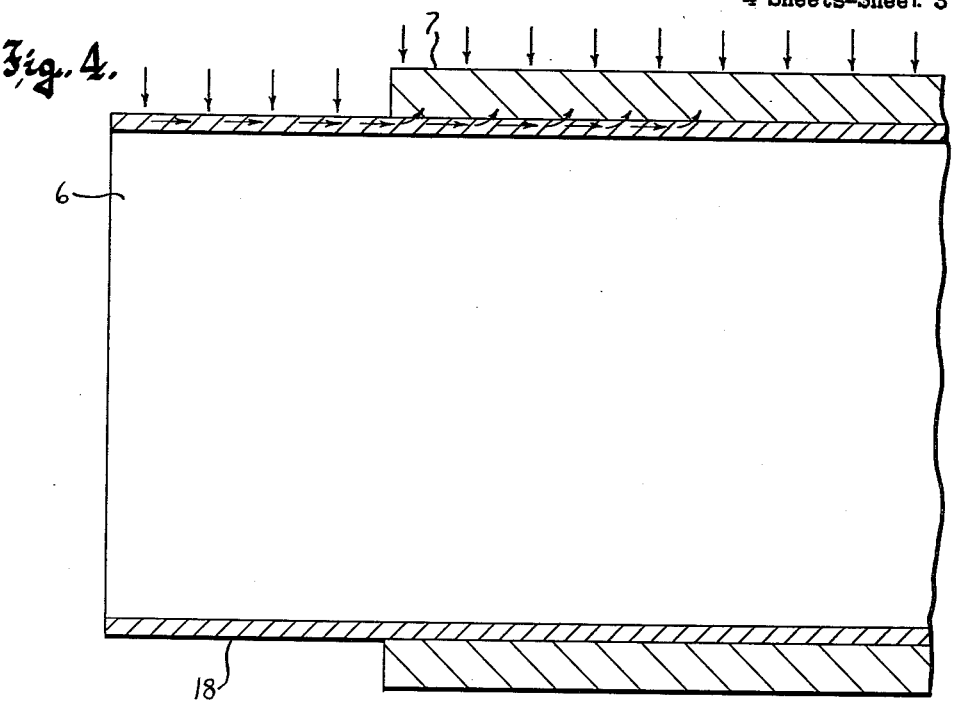
FIGURES 4 and 5 are fragmentary longitudinal sectional views, respectively through a conventional mandrel and a mandrel adapted to the practice of this invention, for purposes of comparison.

Referring now particularly to the accompanying drawings, and especially to FIGURE 1, the numeral 5 designates a tube-forming machine in which wet paper pulp is wound, or otherwise applied to a mandrel 6 to form a multi-layered or laminated moist fibrous tube 7 on the mandrel. The manner in which the pulp is applied to the mandrel forms no part of this invention and may follow conventional practice, as for instance that diagrammatically illustrated in the Hensler Patent No. 2,532,494.

In this case, the pulp which is used to produce the fibrous tube may be contained in a vat 8 in the bottom of the tube-forming machine, and into which a rotating cylindrical screen or perforated cylinder 9 dips, so that by maintaining a partial vacuum or differential level in the cylinder 9, pulp adheres to its exterior. This "picked-up" pulp is transferred to a roll or cylinder 10 by which the resulting wet pulp blanket or "sheet" is carried to the mandrel 6 and applied thereto as the latter rotates in a given position above the roll 10, where it is supported by its opposite end portions on a track 11. It is important to note that the pulp is so applied to the mandrel that the end portions of the mandrel are left exposed, i.e. project from the ends of the tube 7 thereon.

When the tube 7 being formed on the mandrel has reached its predetermined diameter, a sensing device 12 functions to release the mandrel 6 with the moist or wet fibrous tube thereon for travel along the track 11, out of the tube forming machine and into a drying chamber or oven, indicated generally by the numeral 13.

At the same time that the sensing mechanism 12 effects release of the mandrel with the formed tube 7 thereon, it also releases or disables a stop 14 which had been holding the next mandrel 6 in a fixed position in front of the entrance to the tube forming machine.

Since the embodiment of the invention illustrated in FIGURE 1 utilizes a liquid heat absorbing media, each mandrel while it is held by the stop 14, has a predetermined amount of liquid, preferably water, discharged into its opposite ends under the control of a valve 15, which also responds to the sensing device 12. This procedure is, of course, repeated as long as mandrels 6 are fed to the tube forming machine.

In the drying chamber or oven 13, the moist or practically wet tubes 7 are dried. The construction of the oven or chamber 13 may follow any conventional pattern, and may be equipped with conveyor chains 13' which cause the mandrels with their moist or wet tubes thereon, to roll slowly along tracks 16 until they finally leave the oven or chamber, as at 17.

Whatever means are employed to convey the mandrels with the tubes 7 thereon through the drying oven or chamber in that embodiment of the invention which utilizes pools of water in the end portions of the mandrels as the heat absorbing media, will obtain better results if the mandrels are continually rotated with their axes horizontal. This result may be achieved in any suitable way as by equipping the conveyor chains with fingers that push the mandrels along the upwardly inclined tracks 16.

To the extent that the description thus far explains the formation of moist or wet fibrous tubes on the mandrels, and the drying of the tubes in the drying oven or chamber, the invention follows conventional practice. But to attain the objectives of the invention, all of the mandrels 6 are of a construction quite different from any mandrels heretofore used in the making of fiber pipe or conduit.

Thus, for one way of practicing the invention, and as shown in FIGURES 1, 2 and 3, each mandrel 6 which consists of a metal tube 18 having a uniform outside diameter, has two axially spaced annular dams 19 and 20 secured therein. These dams may be formed as aluminum stampings and preferably as apertured cups of a size to be press fitted into the tube 18, and then anchored thereto in any suitable way.

The axially spaced dams 19 and 20 in each of the opposite end portions of the tube 18 confine pools of water 21 therebetween—providing, of course, that the mandrel is supported with its axis horizontal, as by resting upon the tracks 11 or their counterparts 16. As already observed, the water to provide the pools 21 is introduced into the opposite ends of each mandrel as it comes to rest in front of the entrance of the tube-forming machine 5, where it is held by the releasable stop 14.

Obviously, of course, to inject water into the opposite ends of the mandrels as they come to rest in this position, there must be two nozzles 22—only one of which is shown in FIGURE 1—positioned to direct the water discharging therefrom into the space between the dams 19 and 20 of a mandrel in position. The pools of water 21 may remain in the mandrels throughout the entire drying process, and even until the formed "white" tubes are stripped from the mandrels, or the water may be completely evaporated before the tube is fully dry. Normally, the tubes are not stripped from the mandrels until they are completely dry, but in some cases they may be removed while still partly moist.

As discussed at length in the aforesaid Ewing et al. patent, drying of the moist or wet tubes 7 must be so controlled that the moisture is driven therefrom through its outer side. This means that the drying must progress from the outside toward the inside. While the procedures disclosed in the Ewing et al. patent achieve this result, they have serious disadvantages, as hereinbefore noted.

This invention controls the drying of the tubes by absorbing heat from the metal mandrels and thereby reducing the conduction of that heat by the mandrels into the tubes thereon. Since the mandrels, as well as the moist or wet fibrous tubes thereon, are subjected to the heat in the drying oven or chamber 13, they will become heated and will conduct heat to the contiguous portion of the tubes 7 thereon unless means are employed to prevent it. If any considerable quantity of heat is conducted to the tube, the inside of the tube will dry before the outer portions thereof with the result that voids and delaminations occur within the tube wall.

The presence of the pools of water 21 in the opposite end portions of the mandrels, and the fact that the mandrels rotate as they move through the drying oven or chamber, results in a film of water 21' on the inner surface of the mandrel at its hottest portions, and as this film evaporates, heat is very effectively absorbed from the end portions of the mandrel, thus greatly minimizing the amount of heat conducted to the tube by the mandrel.

Figure 5:
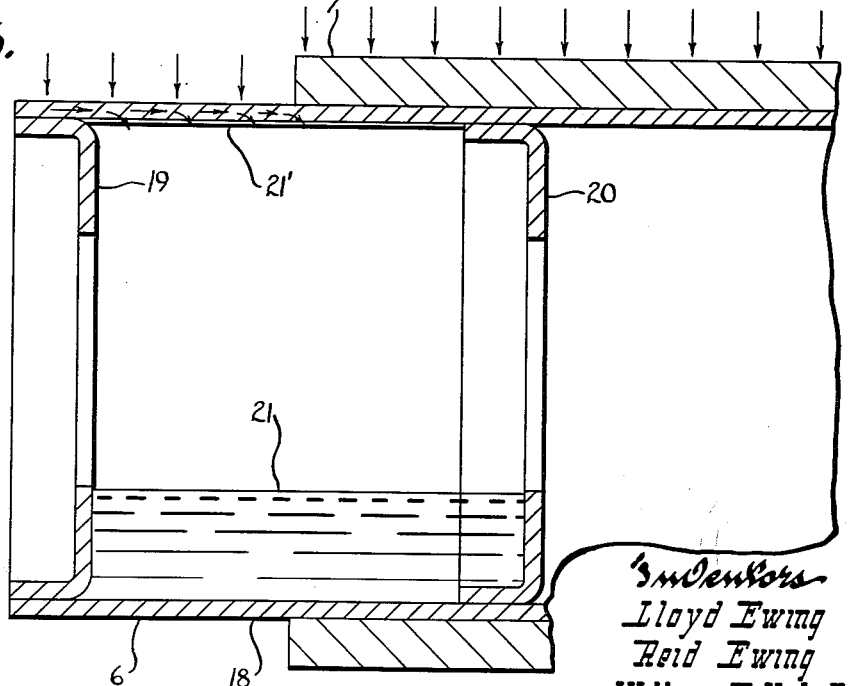

The advantage of absorbing heat from the mandrel as by water pools in the ends of the mandrel and rotation of the mandrel, is evident from a comparison of FIGURES 4 and 5. FIGURE 4 illustrates the situation which would obtain in the absence of any means of absorbing heat from the mandrel. In this case, the heat as shown by arrows, would flow by conduction from the exposed end portions of the mandrel into the fibrous tube thereon, but with a water pool and a film of water covering the inner surface of the mandrel above the pool, as a result of the rotation of the mandrel, or some other way of absorbing heat from the mandrel, the excess heat which enters the exposed end portions of the mandrel is absorbed before it can reach the fibrous tube.

Where pools of water in the end portions of the mandrel are employed as the heat absorbing media, the relatively small volume thereof is compensated by the increased rate of evaporation which results from continually wetting the inner surface of the mandrel end portions above the water pools by rotating the mandrel. Moreover, the quantity of heat absorbed by the evaporation of the water is extremely high due to the effect of the latent heat of evaporation.

Although those skilled in the art should experience no difficulty in understanding the process of this invention from the description thus far, it may be beneficial to point out that ordinary tap water at a temperature of 50–70° F. may be used to produce the pools, and that the volume of water in each pool need be only a few ounces for four or four and one-half inch diameter mandrels.

The temperature in the drying oven or chamber may be between 160° and 340° F., and the drying time will range between three and ten hours, depending upon the temperature, humidity, air velocity, and wall thickness of the tubes being dried.

Water, of course, is the cheapest liquid that can be used in the practice of the invention, and probably would never be replaced, but it should be understood that the invention emcompasses the possible use of some other liquid where special considerations would require it.

Another alternative which should not be overlooked concerns the specific construction of the mandrels and the manner in which they are transported or moved through the drying oven or chamber. Having the mandrels disposed horizontally throughout the entire procedure is by far the most practicable way of performing the various operations, but if for some reason it is desired to convey the mandrels with the fibrous tubes thereon in a pendent vertical position, as in the Hensler patent, this can be done. In this case, the mandrels would be formed as shown in FIGURE 6, wherein the water pools 30 occupy the bottom of upwardly opening annular spaces 31 formed in the end portions of the mandrel conjointly by the wall of the mandrel and the cylindrical wall of flanged sleeves 32 secured in the ends of the mandrel. Obviously, some suitable carrying means would have to be provided for pendently carrying the mandrel through the drying oven or chamber and, if the volume of the pools is insufficient to absorb the required amount of heat without dependance upon evaporation, some means could be provided for continuously shaking or moving the pendently supported mandrels so as to cause the water pools 30 to slosh up the sides of the annular spaces 31 and wet the contiguous inner wall of the mandrel and thereby increase the area of the water surface. This could be done by simply having the pendently supported mandrels periodically collide with obstructions to their movement along a defined path, as indicated at 35 in FIGURE 6.

Though it has been found entirely practicable and feasible to use relatively small pools of water in the opposite end portions of the mandrels, a single larger pool extending for the full length of the mandrel could be employed, as shown in FIGURE 7. In this case, there are only two dams 36—one at each end of the mandrel—and between them lies the pool of water 37.

Water pools are probably the cheapest heat absorbing media that can be used in the practice of this invention, but as noted hereinbefore, the mandrels may be equipped with other heat absorbing means. Thus, as shown for instance in FIGURE 8, the heat absorbing media may be a body of material 38 which is solid at room temperatures but melts and becomes a liquid at the elevated temperatures in the drying oven. The material 38 may be confined between two partition walls 39, and secured in place in any suitable manner. Its volume must be large enough to absorb the required amount of heat upon melting, and it should be a poor conductor so as to retard the transmission of heat to the "white" tube on the mandrel. An example of material that could be used for this purpose is ordinary paraffin, which has a melting point of about 125° F., has good corrosion resistant properties, and is low in cost.

Still another example of a heat absorbing media that could be employed is illustrated in FIGURE 9, wherein the physical structure is identical to that of FIGURE 8, but the body of heat absorbing material 40 is a liquid at all temperatures involved and absorbs the required heat by simply having its temperature raised. The material used in this case should have a high specific heat and a safe boiling point above the drying temperatures. Ethyleneglycol is an example of a material that could be used in this instance.

Finally, the desired heat absorption could be obtained by mounting a series of axially spaced walls or plugs 41 in the opposite end portions of the mandrel, as shown in FIGURE 10. These walls or plugs should be so separated that they can absorb the required heat without transmitting it axially to the portion of the mandrel on which the "white" tube is located. Iron is a satisfactory material for this purpose because of its high specific heat per unit volume, though aluminum could be employed to assure against differential expansion problems.

From the foregoing description taken with the accompanying drawings, it will be apparent to those skilled in this art that this invention presents a highly practicable and commercially feasible method of drying the fibrous tubes from which fiber pipe and conduit is made, and that among the advantages of the invention, the following are but exemplary:

The means employed to absorb heat from the exposed end portions of the mandrels so as to prevent conduction of excessive heat to the inner surface of the "white" tube, is carried by the mandrel, and in each case the dams or walls used to confine the heat absorbing media is a permanent part of the mandrel and may be made of metal, so that no part of the mandrel will be deleteriously affected by the temperatures which obtain in the drying oven;

Since the dams or walls used to confine the heat absorbing media are fixed in the mandrels, there is a large saving in handling expense over that involved in earlier methods which entailed insertion and removal of plugs;

The needed modification of existing mandrels to equip them with the dams or other confining walls in accordance with this invention may be made very cheaply;

The mandrels are maintenance free; and

Because nothing protrudes beyond the ends of the mandrels, the width of the drying oven need be only sufficient to accommodate the mandrels.

What is claimed as our invention is:

1. Apparatus for use in the production of fiber pipe and conduit, comprising:
    A. an elongated hollow metal mandrel having annular walls fixed in its end portions to form axially spaced dams between which water may be confined;
    B. means for applying wet pulp onto the mandrel to form a moist fibrous tube thereon of a length less than that of the mandrel;
    C. means for supporting the mandrel and the moist tube thereon with its axis horizontal;
    D. means for injecting water into the interior of the mandrel to be confined therein between said dams as long as the mandrel remains substantially horizontal;
    E. a drying chamber in which the moist fibrous tube may be dried;
    F. means inside the drying chamber to support the mandrel with its axis horizontal, and
    G. means to effect rotation of the mandrel and the moist tube thereon while in the drying chamber,
        (1) so that the water in the mandrel between said dams wets the inner surface of the mandrel above the level thereof,
        (2) the heating of the water and its evaporation abstracting heat from the mandrel and minimizing the amount of heat than can be conducted to the tube by the mandrel.

2. Apparatus for use in the production of fiber pipe or conduit, comprising:
    A. an elongated hollow mandrel having at least one open end;
    B. means for applying wet pulp onto the mandrel to form a moist fibrous tube thereon of a length less than that of the mandrel;
    C. means for introducing a vaporizable liquid into the interior of the hollow mandrel through an open end thereof;
    D. means for confining said vaporizable liquid in said mandrel with the liquid exposed to the surrounding atmosphere through an open end of the mandrel;
    E. a drying chamber in which the moist fibrous tube may be dried;
    F. means inside the drying chamber to support the mandrel with the interior of the mandrel in open communication with the interior of the drying chamber; and G. means to cause the vaporizable liquid in the mandrel to be distributed over the entire inner surface of its end portions, while the mandrel is in the drying chamber, so that the liquid in the mandrel, the heating of the liquid and its evaporation coact to abstract heat from the mandrel and minimize the amount of heat that can be conducted to the tube by the mandrel.

3. In the art of making fiber pipe and conduit, the method of drying the moist fibrous tube from which the pipe or conduit is made and which is produced by applying wet pulp onto a tubular mandrel, which method is characterized by the following steps:
  A. introducing a vaporizable liquid into the interior of the mandrel through an open end thereof;
  B. so confining said liquid in the mandrel that a quantity thereof is in each end portion of the mandrel;
  C. subjecting the mandrel with the fibrous tube thereon to heat to drive the moisture from the tube and vaporize the liquid in the mandrel; and
  D. as the drying proceeds keeping the entire inner surface of the end portions of the mandrel wet with the vaporizable liquid.

4. In the art of making fiber pipe and conduit, the method of drying the moist fibrous tube from which the pipe or conduit is made and which is produced by applying wet pulp onto a tubular mandrel, which method comprises:
  A. so controlling the application of the wet pulp to the mandrel that an end portion of the mandrel is left uncovered;
  B. supporting the mandrel with its axis substantially horizontal;
  C. with the mandrel thus supported moving the same along a defined path;
  D. injecting a quantity of vaporizable liquid into said end portion of the mandrel;
  E. maintaining the liquid as a discreet pool in said end portion of the mandrel
    (1) with said pool extending axially into the mandrel beyond the adjacent end of the tube and
    (2) with the surface of the pool exposed so that upon heating thereof it evaporates and by such heating and evaporation abstracts heat from the mandrel and minimizes the amount of heat that can be conducted to the tube from the uncovered end portion of the mandrel; and
  F. rotating the mandrel as the drying proceeds and the mandrel moves along said path so that the liquid pool continually covers fresh surface portions of the mandrel and the surface portions above the pool are kept wet.

5. The method of making pipe and conduit from fibrous pulp which comprises:
  A. applying successive layers of wet pulp onto a tubular metal mandrel which is open at least at one end to form a moist fibrous tube thereon of a length less than that of the mandrel, so that the end portions of the mandrel are left exposed;
  B. supporting the mandrel by its exposed end portions with its axis substantially horizontal;
  C. introducing water into the interior of the mandrel through its open end;
  D. maintaining the water as a pool in each end portion of the mandrel;
  E. with the mandrel horizontal moving the same along a defined path;
  F. as the mandrel with the tube thereon moves along said path subjecting it to heat to drive moisture from the tube; and
  G. as the drying of the tube proceeds and the mandrel moves along said path, rotating the mandrel so that the pools of water therein wet the inner surface of the exposed end portions of the mandrel above the normal level of the pools.

References Cited in the file of this patent

UNITED STATES PATENTS

| | | |
|---|---|---|
| 1,608,207 | Gammeter | Nov. 23, 1926 |
| 1,713,502 | Steps | May 14, 1929 |
| 1,990,882 | Sargent | Feb. 12, 1935 |
| 2,396,338 | Newton | Mar. 12, 1946 |
| 2,406,303 | Levy | Aug. 20, 1946 |
| 2,616,668 | Van Weenan et al. | Nov. 4, 1952 |
| 2,618,075 | Everhart | Nov. 18, 1952 |
| 2,723,083 | Bary | Nov. 8, 1955 |
| 2,724,189 | Ewing et al. | Nov. 22, 1955 |
| 2,893,136 | Justus et al. | July 7, 1959 |
| 2,966,241 | Martin | Dec. 27, 1960 |

FOREIGN PATENTS

| | | |
|---|---|---|
| 7,271 | Great Britain | 1899 |